(12) United States Patent
Osada

(10) Patent No.: US 9,275,279 B2
(45) Date of Patent: Mar. 1, 2016

(54) IMAGE PROCESSING APPARATUS AND IMAGE PROCESSING METHOD

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventor: Kunio Osada, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 0 days.

(21) Appl. No.: 14/461,511

(22) Filed: Aug. 18, 2014

(65) Prior Publication Data

US 2014/0355896 A1    Dec. 4, 2014

Related U.S. Application Data

(63) Continuation of application No. PCT/JP2012/068631, filed on Jul. 23, 2012.

(30) Foreign Application Priority Data

Mar. 16, 2012    (JP) ................................. 2012-060447

(51) Int. Cl.
G06K 9/34    (2006.01)
G06K 9/00    (2006.01)
G06K 9/46    (2006.01)

(52) U.S. Cl.
CPC ............ *G06K 9/00442* (2013.01); *G06K 9/346* (2013.01); *G06K 9/4647* (2013.01); *G06K 2209/011* (2013.01)

(58) Field of Classification Search
CPC ................. G06K 9/72–9/726; G06K 9/00872
See application file for complete search history.

(56) References Cited

U.S. PATENT DOCUMENTS

| 6,996,280 B1* | 2/2006 | Matsukawa et al. .......... 382/236 |
| 7,359,568 B2 | 4/2008 | Dobashi |
| 7,961,948 B2 | 6/2011 | Katsuyama |

FOREIGN PATENT DOCUMENTS

| JP | 11-161739 | 6/1999 |
| JP | 2004-030188 | 1/2004 |
| JP | 2005-004334 | 1/2005 |
| JP | 2005-285006 | 10/2005 |
| JP | 2008-191906 | 8/2008 |

(Continued)

OTHER PUBLICATIONS

Sugiura, et al. "Handwritten Characters Recognition for Binary Image Using Distance Transform", IEICE Technical Report PRMU 2010-237-PRMU 2010-296, p. 112.

(Continued)

*Primary Examiner* — Siamak Harandi
(74) *Attorney, Agent, or Firm* — Turocy & Watson, LLP

(57) ABSTRACT

According to an embodiment, an image processing apparatus selects as an output image a candidate character component, from which a non-character component is removed, in a gradation having the largest number of pixels when there is a significant difference between the number of character pixels in the gradation having the largest number of character pixels and the number of character pixels in a gradation having the second largest number of character pixels, and selects as an output image a candidate character component, from which the non-character component is removed, in a gradation having the smallest number of edge pixels when there is no significant difference between the number of character pixels in the gradation having the largest number of character pixels and the number of character pixels in the gradation having the second largest number of character pixels.

6 Claims, 15 Drawing Sheets

(56) References Cited

FOREIGN PATENT DOCUMENTS

| | | |
|---|---|---|
| JP | 2009-199276 | 9/2009 |
| JP | 2012-174163 | 9/2012 |

OTHER PUBLICATIONS

Written Opinion for International Application No. PCT/JP2012/068631 Dated Oct. 9, 2012, 3 pgs.

International Search Report for International Application No. PCT/JP2012/068631 Dated Oct. 9, 2012, 6 pages.

Office Action of Notice of Rejection for Japanese Patent Application No. 2012-060447 Dated Mar. 26, 2012.

Office Action of Notice of Rejection for Japanese Patent Application No. 2012-060447 Dated Sep. 24, 2012.

* cited by examiner (a)  (b)

東北地区大会

FIG.15
(a)
(e)
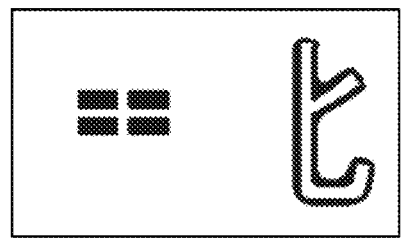
(b)
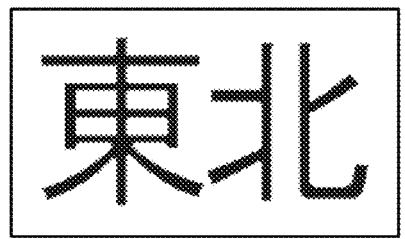
(f)
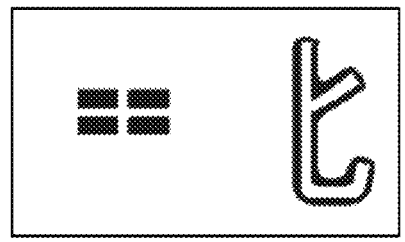
(c)
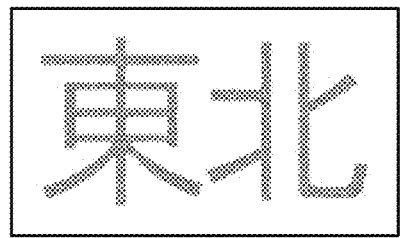
(g)
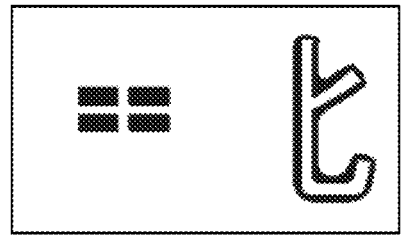
(d)
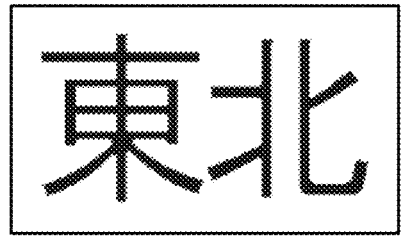
(h)

FIG.17
(a)
(e)
(b)
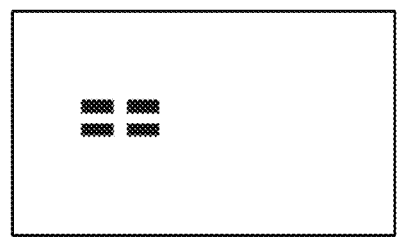
(f)
(c)
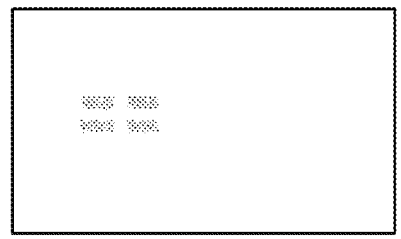
(g)
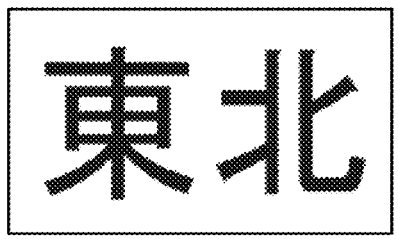
(d)
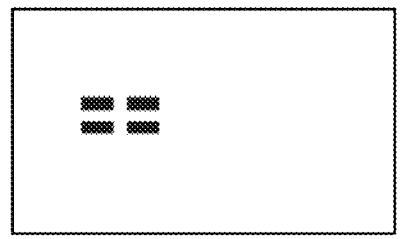
(h)

FIG.18
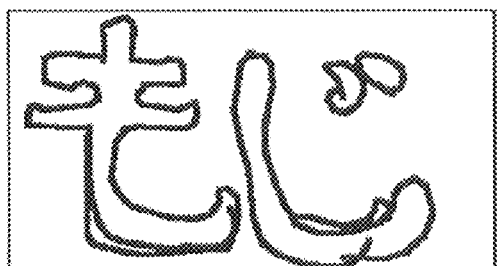 
(a) (b)

IMAGE PROCESSING APPARATUS AND IMAGE PROCESSING METHOD

CROSS-REFERENCE TO RELATED APPLICATIONS

This application is a continuation of PCT international application Ser. No. PCT/JP2012/068631 filed on Jul. 23, 2012 which designates the United States, incorporated herein by reference, and which claims the benefit of priority from Japanese Patent Application No. 2012-060447, filed on Mar. 16, 2012, the entire contents of which are incorporated herein by reference.

FIELD

Embodiments described herein relate generally to an image processing apparatus and an image processing method which extract a character from image data.

BACKGROUND

There is conventionally known a technique of extracting a character by removing an outline portion thereof when an outlined character is included in image data. As a specific method, there is a technique of acquiring a character by first converting image data to a binary image, followed by cutting out a character for each gradation, determining whether the cut-out character is a normal character or an outline character, and performing an image correction of converting the character to the normal character when the character is the outline character. There also exists a technique of performing character recognition on the image data by referring to a plurality of character recognition dictionaries, calculating reliability of the result of the character recognition as a character, and selecting the recognition result with high reliability.

However, it has been difficult in some cases to cut out a character by the conventional method of extracting a character by image processing when the character has a thick outline or is in contact with another character. Moreover, when using the character recognition dictionary, the amount of calculation tends to increase since the calculation is performed by combining the plurality of character recognition dictionaries.

BRIEF DESCRIPTION OF THE DRAWINGS

FIG. 15 illustrates the transition of the state of the converted image in the character pixel extraction process according to an embodiment;

FIG. 17 illustrates the transition of the state of the converted image in the character pixel extraction process according to an embodiment; and FIG. 18 is a diagram illustrating an example of the image data according to an embodiment.

DETAILED DESCRIPTION

According to an embodiment, an image processing apparatus includes an acquisition unit, an extraction unit, a removal unit, a pixel counting unit, an edge counting unit, an output image selection unit, and an output unit. The acquisition unit is configured to acquire image data. The extraction unit configured to extract a set of candidate character components from the image data for each gradation of the image data on the basis of a predetermined first criterion. The removal unit is configured to remove a non-character component from the set of the candidate character components on the basis of a predetermined second criterion. The pixel counting unit is configured to count the number of character pixels representing the number of pixels included in the candidate character component after the non-character component is removed. The edge counting unit is configured to count the number of edge pixels representing the number of edge pixels adjacent to the candidate character component after the non-character component is removed. The output image selection unit is configured to select as an output image the candidate character component, from which the non-character component is removed, in the gradation having a largest number of pixels when there is a significant difference between the number of character pixels in the gradation having the largest number of character pixels and the number of character pixels in the gradation having the second largest number of character pixels. The output image selection unit is configured to select as the output image the candidate character component, from which the non-character component is removed, in the gradation having a smallest number of edge pixels when there is no significant difference between the number of character pixels in the gradation having the largest number of character pixels and the number of character pixels in the gradation having the second largest number of character pixels. The output unit is configured to output the output image being selected.

Figure 1:
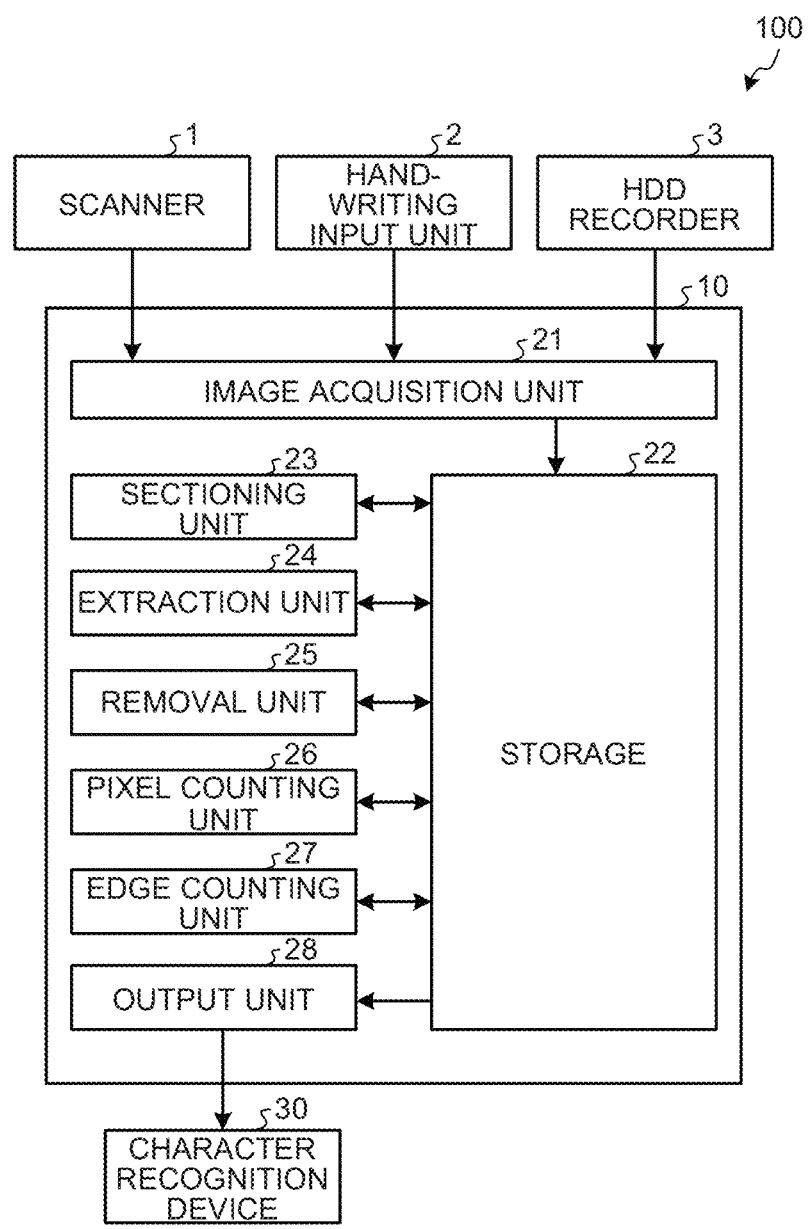
FIG. 1 is a functional block diagram of an image processing system which includes an image processing apparatus according to an embodiment.

Embodiments of an image processing apparatus will now be described in detail with reference to the drawings. Note that the invention is not to be limited by the embodiments. FIG. 1 is a block diagram illustrating a configuration of an image processing system 100 which includes an image processing apparatus 10 according to the present embodiment.

As illustrated in FIG. 1, a scanner 1, a handwriting input unit 2, an HDD recorder 3 and the like each serving as an input device in the image processing system 100 are connected to the image processing apparatus 10. Image data from these input devices is input to the image processing apparatus 10.

The image processing apparatus 10 includes general-purpose hardware such as a CPU, a memory, a hard disk, and an input/output interface. The image processing apparatus 10 includes an image acquisition unit 21, a storage 22, a sectioning unit 23, an extraction unit 24, a removal unit 25, a pixel counting unit 26, an edge counting unit 27, and an output unit 28. The storage 22 is implemented by a storage memory and the hard disk. Moreover, each of the image acquisition unit 21, the sectioning unit 23, the extraction unit 24, the removal unit 25, the pixel counting unit 26, the edge counting unit 27, and the output unit 28 is implemented as a function of an image processing program stored in the hard disk, for example.

The image acquisition unit 21 acquires image data to be processed that is input from the input device, and writes the acquired image data to the storage 22. The sectioning unit 23 reads the image data from the storage 22 and sections the image data into one or more sectioned area(s). The sectioning unit 23 then writes to the storage 22 a piece of coordinate information corresponding to a start position and an end position in each sectioned area of the sectioned image data.

The extraction unit 24 reads the image data as well as the start position and end position of each sectioned area from the storage 22, extracts a character pixel from the image data included in each sectioned area, and writes the character pixel into the storage 22. The removal unit 25 removes an outline and a non-character component from the character pixel extracted by the extraction unit 24 and writes into the storage 22 a character pixel undergone such removal. The pixel counting unit 26 and the edge counting unit 27 count the number of pixels included in a candidate character component and function in cooperation with the extraction unit 24. The detail will be described later on. The output unit 28 reads the character pixel from the storage 22 as an output image and outputs the image to a character recognition device 30 such as an OHP on which a character can be recognized.

Figure 2:
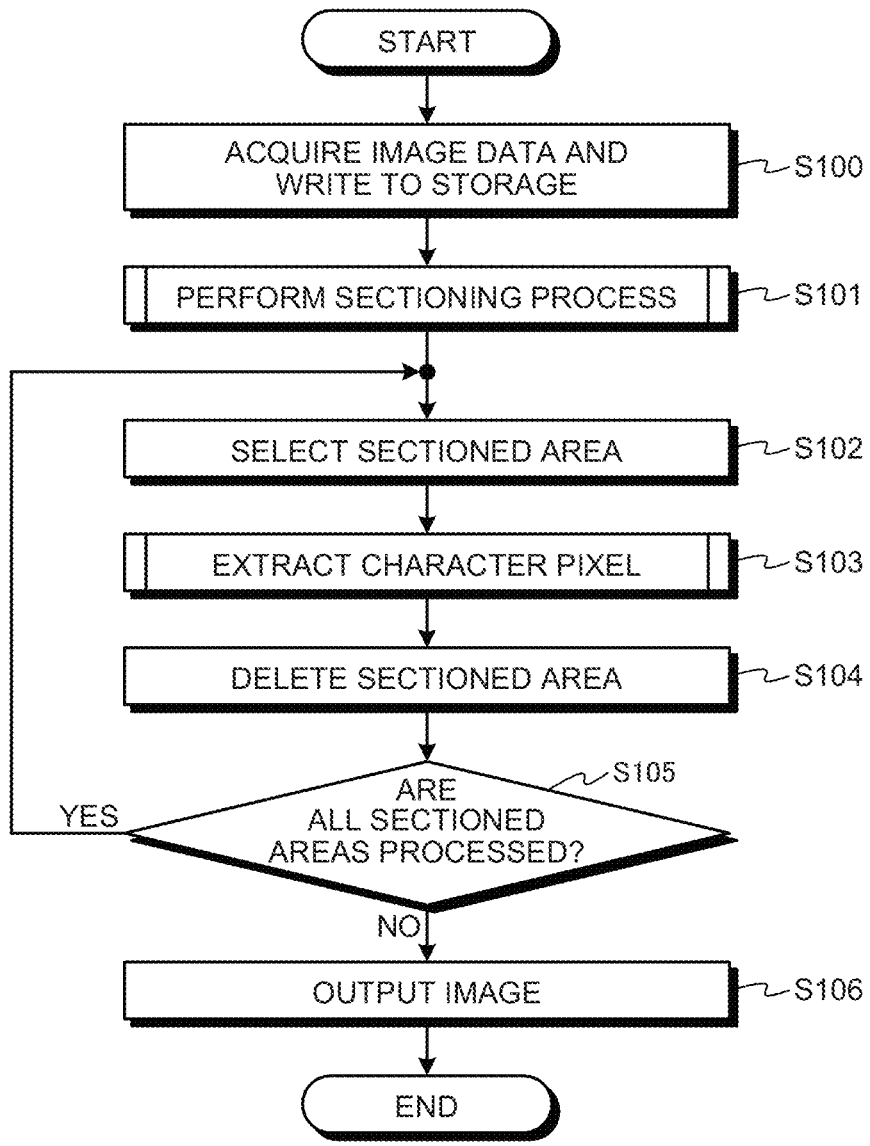
FIG. 2 is a flowchart illustrating an image processing flow according to an embodiment.
Figure 3:
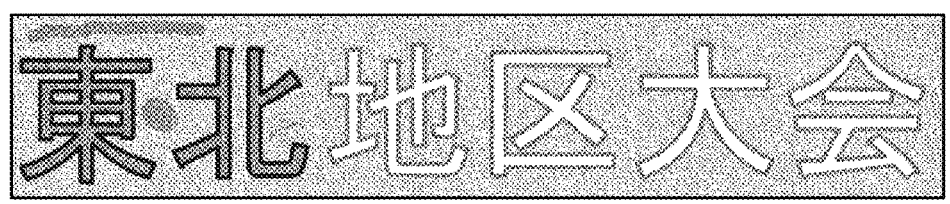
FIG. 3 is a diagram illustrating an example of image data according to an embodiment.

Now, the flow of a process performed in the image processing system of the embodiment will be described with reference to FIG. 2. The image processing apparatus 10 acquires image data of a character string from the input device and writes the acquired image data into the storage 22 (step S100). FIG. 3 illustrates an example of the image data that is a gray scale image with the width equal to 1100 pixels, the height equal to 215 pixels, and the possible pixel value of 0 or larger and 255 or smaller. Note that the image data may be a color image or a binary image. Next, the sectioning unit 23 reads the image data from the storage 22, sections the image data into one or more sectioned areas, and writes a start position and an end position of each sectioned area of the image data to the storage 22 (step S101).

The extraction unit 24 then selects one of the sectioned areas from the storage 22 (step S102). In the present embodiment, the sectioned areas are selected in the order that the sectioned areas are written into the storage 22. Subsequently, the extraction unit 24 performs a character pixel extraction process of extracting a set of candidate character components (to be described) from within the sectioned area selected in step S102 and, after a non-character component to be described is removed from the candidate character components by the removal unit 25, writing a character pixel forming the candidate character component into the storage 22 (step S103). The extraction unit 24 thereafter deletes from the storage 22 the sectioned area selected in step S102 (step S104). The sectioned area having completed the character pixel extraction process is deleted so that the sectioned area stored next in order in the storage 22 is selected at the time of selecting the sectioned area in next step S102. Note that it may be adapted to be able to select the next sectioned area by changing a pointer of a memory address instead of deleting the sectioned area having completed the character pixel extraction process, for example.

Next, the extraction unit 24 determines whether or not the character pixel extraction process is performed on all the sectioned areas (step S105). When it is determined that the character pixel extraction process is performed on all the sectioned areas (step S105: Yes), the output unit 28 reads the character pixel from the storage 22 and outputs the pixel as an output image to the character recognition device 30, thereby completing the process (step S106). When it is determined that the character pixel extraction process is not performed on all the sectioned areas (step S105: No), on the other hand, the process is repeated again from step S102.

Figure 4:
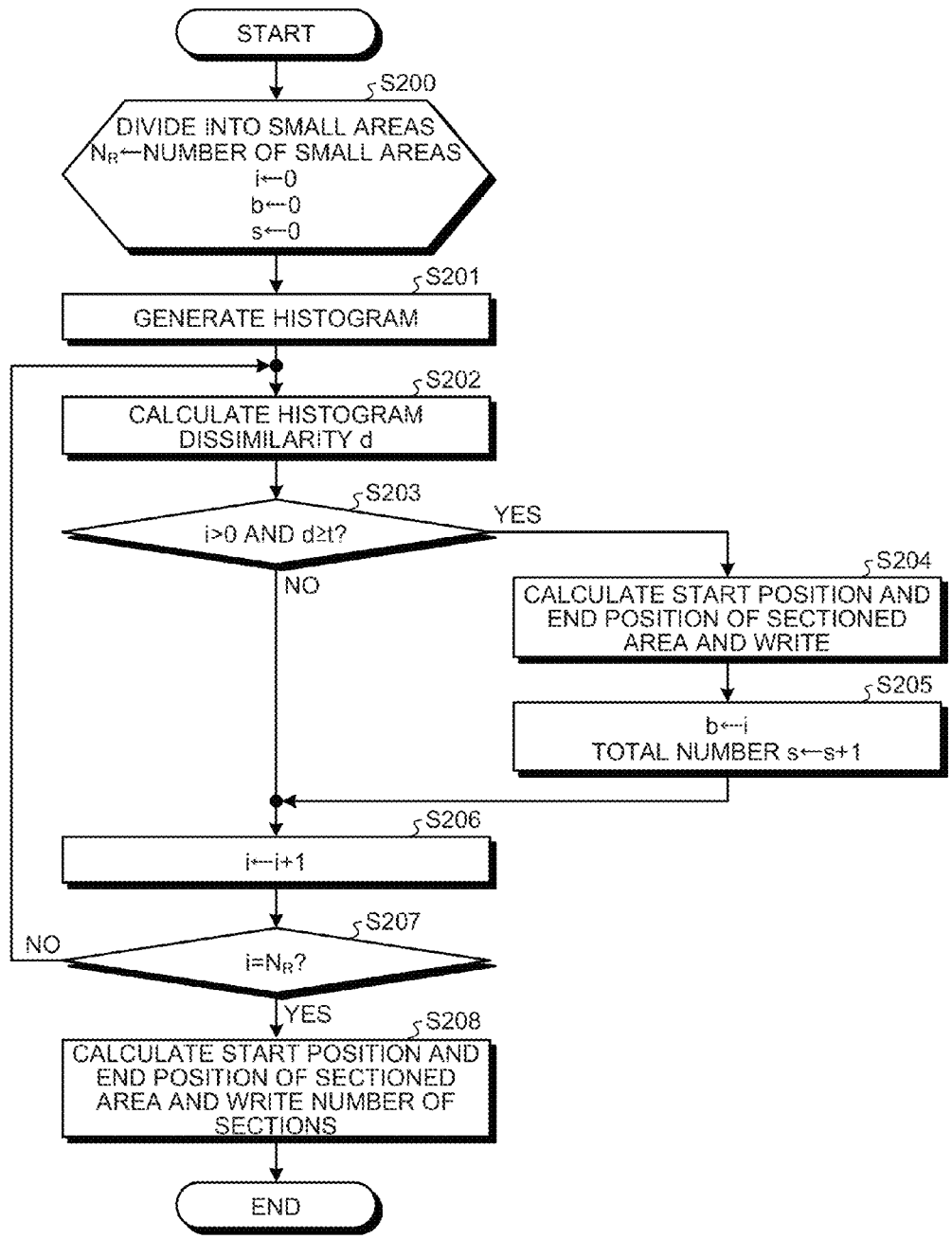
FIG. 4 is a flowchart illustrating the flow of a sectioning process according to an embodiment.

The process of sectioning the image data into the plurality of sectioned areas in step S101 will now be described with reference to FIG. 4. The process of sectioning the image data into the sectioned area can be performed by a method where an area obtained by sectioning the image data at a fixed interval is determined as the sectioned area, an area including a predetermined color is extracted from the image data to be the sectioned area, or an area corresponding to a predetermined position or having a predetermined shape is determined as the sectioned area, for example.

In the present embodiment, continuous areas having similar pixel values in the image data are regarded as the sectioned area of the image data. The sectioning unit 23 first performs an initialization process (step S200) as illustrated in FIG. 4. In the initialization process, the sectioning unit 23 divides the image data into small areas smaller than the sectioned areas by sectioning the image data at equal intervals into $N_R$ small areas according to a direction in which the image data is read. The interval and the number of divisions in dividing the image data may be set as appropriate within the range that the size of the small area is smaller than the sectioned area. The direction in which the character is read may be determined in advance or determined automatically. In the present embodiment, the read direction is determined to be in a horizontal direction when a long side of the image data corresponds to an upper side and a lower side thereof, and is determined to be in a vertical direction when the long side of the image data corresponds to a left side and a right side thereof. The read direction of the image data illustrated in FIG. 3 is in the horizontal direction since the long side of the image corresponds to the upper side and the lower side thereof.

Concerning a parameter, a variable i indicating a number assigned to the small area currently being processed is set to 0. A variable b indicating a position of the small area to be the boundary of the sectioned area is set to 0. A variable s indicating a number assigned to the sectioned area is set to 0.

Figure 5:
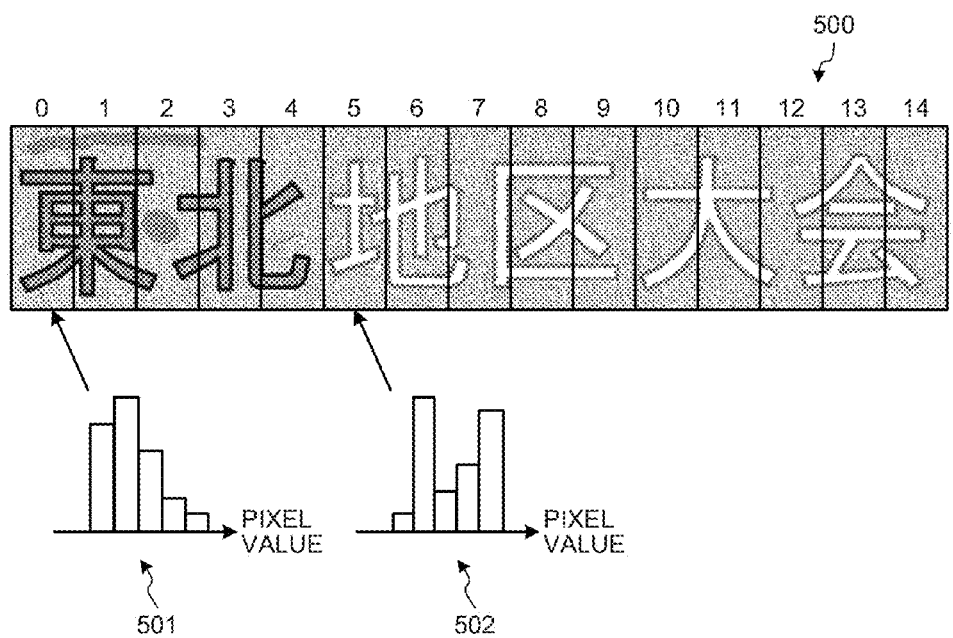
FIG. 5 is a diagram illustrating an example of the image data divided into small areas according to an embodiment.

FIG. 5 illustrates a state of image data 500 divided into the small areas. As illustrated in FIG. 5, the image data 500 is divided into a total of 15 small areas numbered from 0 to 14. The number of small areas may be set to a predetermined value or calculated by using a value of the image data. The number of small areas $N_R$ is calculated by using Equation (1) below in the present embodiment.

$$N_R = \text{integer}\left(\frac{1}{r_R s}\right) \quad (1)$$

In Equation (1), s represents the length of the short side of the image data, l represents the length of the long side of the image, $r_R$ represents a value predetermined as a parameter, and "integer" represents a function which converts an input value to an integer. In the present embodiment where s equals 215 pixels, l equals 1100 pixels, and $r_R$ is set to 0.34, the calculation gives the result "15". Note that while FIG. 5 illustrates an example where the image data is divided into rectangular areas not overlapping each other, the image data may also be divided into small areas overlapping each other or divided into not the rectangular areas but areas in another shape such as an ellipse or a triangle, as another example.

Next, the sectioning unit 23 generates a histogram of a pixel value for each of the $N_R$ small areas being divided (step S201). Graphs indicated by reference numerals 501 and 502 in FIG. 5 are schematic representation of the histograms of the pixel values in zero-th and fifth small areas, respectively. A histogram of an i-th small area is hereinafter represented as $H_i$, and a set of histograms of each of the zero-th to $(N_R-1)$-th small areas is represented as H.

The sectioning unit 23 thereafter calculates a dissimilarity d between a histogram obtained by averaging a b-th histogram to an (i−1)-th histogram, and the i-th histogram (step S202). At this time, b is the variable indicating the start position of the sectioned area currently being processed, whereby the calculated value here indicates whether or not there is a large change in the disposition of the pixel value between the histogram of a certain small area and the histogram of up to the small area immediately preceding the small area belonging to the sectioned area. Here, the dissimilarity d is calculated by using Equation (2) as an example.

$$d=D(H_i, M(H,b,i-1)) \quad (2)$$

Function M(H, b, i−1) outputs a histogram averaged among histograms $H_b, H_{b+1}, \ldots, H_{i-1}$ when i>0, but an output value is not guaranteed when i=0. Function D( ) outputs the dissimilarity between two histograms given by a first argument and a second argument. A plurality of histograms is averaged by calculating a mean and a median of the value of each bin of the histogram. The mean is given to each bin in the present embodiment, for example. Moreover, Function D( ) is implemented as expressed in Equation (3) in the present embodiment, for example.

$$D(H_A, H_B) = \Sigma_{j=0}^{NH}(H_{A,j} - H_{B,j})^2 \quad (3)$$

In Equation (3), $H_{A,j}$ indicates the value of a j-th bin of a histogram $H_A$, and $H_{B,j}$ indicates the value of a j-th bin of a histogram $H_B$. Note that j is an integer in the range $0 \leq j < N_H$, where $N_H$ is the number of bins in the histogram.

Subsequently, the sectioning unit 23 determines whether or not i is larger than 0 and the dissimilarity d calculated in step S202 is larger than or equal to a predetermined threshold $t_d$ (step S203). There is a change in the disposition of the histogram when it is determined that i is larger than 0 and the dissimilarity d is larger than or equal to the predetermined threshold $t_d$ (step S203: Yes), in which case the set of small areas up to the one immediately preceding the area in question is determined as the sectioned area so that the sectioning unit 23 determines the start position and the end position of an s-th sectioned area and writes these positions to the storage 22 (step S204). The start position and the end position are calculated by a method using Equation (4) in the present embodiment.

$$P_s = \begin{cases} \left\{0, \dfrac{(i+a)l}{N_R}\right\}, & \text{if } s=0 \\ \left\{1 - \dfrac{2al}{N_R}\right\} + P_{s-1,1}, \min\left(l, \dfrac{il}{N_R}\right), & \text{otherwise} \end{cases} \quad (4)$$

In Equation (4), $P_s$ represents a set of the start position and the end position of the sectioned area, namely, $P_s$={start position, end position}, and $P_{s-1,1}$ represents the end position of an (s−1)-th sectioned area. Parameter a represents a predetermined value to adjust the start position and the end position, and min( ) is a function which outputs the minimum argument value.

Next, the sectioning unit 23 substitutes the variable of i into the value of b as the start position of a next sectioned area and adds 1 to S that is the number assigned to the sectioned area (step S205). The process thereafter shifts to step S206. The process also shifts to step S206 when it is determined that i equals 0 or the dissimilarity d is not larger than or equal to the predetermined threshold $t_d$ (step S203: No).

In step S206, the sectioning unit 23 adds 1 to i and shifts to a process to be performed on the next small area (step S206). The sectioning unit 23 thereafter determines whether or not the value of i is equal to $N_R$ (step S207). When it is determined that the value of i is equal to $N_R$, namely, the sectioning process is completed for all the small areas (step S207: Yes), the sectioning unit 23 calculates the value of each of the start position and the end position of the sectioned area to write these values to the storage 22 as performed in step S204, and at the same time writes to the storage 22 the current number of sections s+1 as the total number of sectioned areas, thereby completing the process (step S208). When it is determined that the value of i is not equal to $N_R$ (step S207: No), on the other hand, the process is repeated from step S202.

Figure 6:
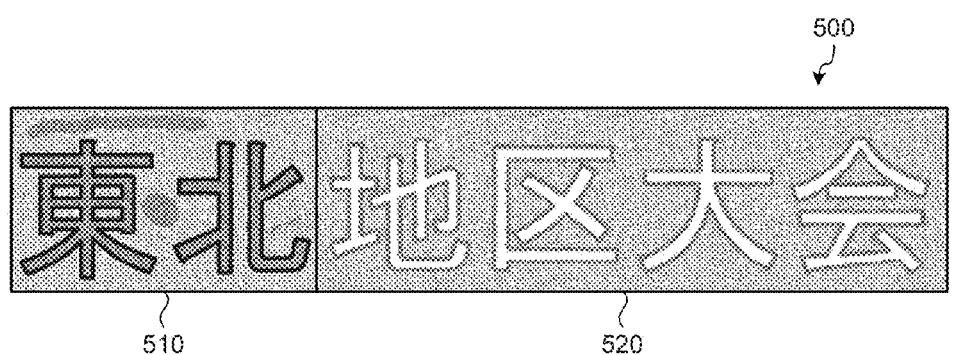
FIG. 6 is a diagram illustrating an example of the image data sectioned into sectioned areas in an implementation area.

When FIG. 3 illustrates the image data, the dissimilarity d calculated in step S202 takes a relatively small value where i is in the range of $0 \leq i \leq 4$ since the disposition of the histogram calculated from the brightness of the character, the outline and a background is similar in each of the small areas up to the fifth divided area in FIG. 5. On the other hand, a sixth small area has the brightness of the character, the outline, and the background different from that of each of the zero-th to fifth small areas. Accordingly, the dissimilarity d when i=5 has a value larger than that when $0 \leq i \leq 4$. The d therefore falls below the predetermined threshold $t_d$ when $0 \leq i \leq 4$ and becomes larger than or equal to $T_d$ when i=5, whereby a first sectioned area 510 and a second sectioned area 520 can be obtained in this example as illustrated in FIG. 6.

Figure 7:
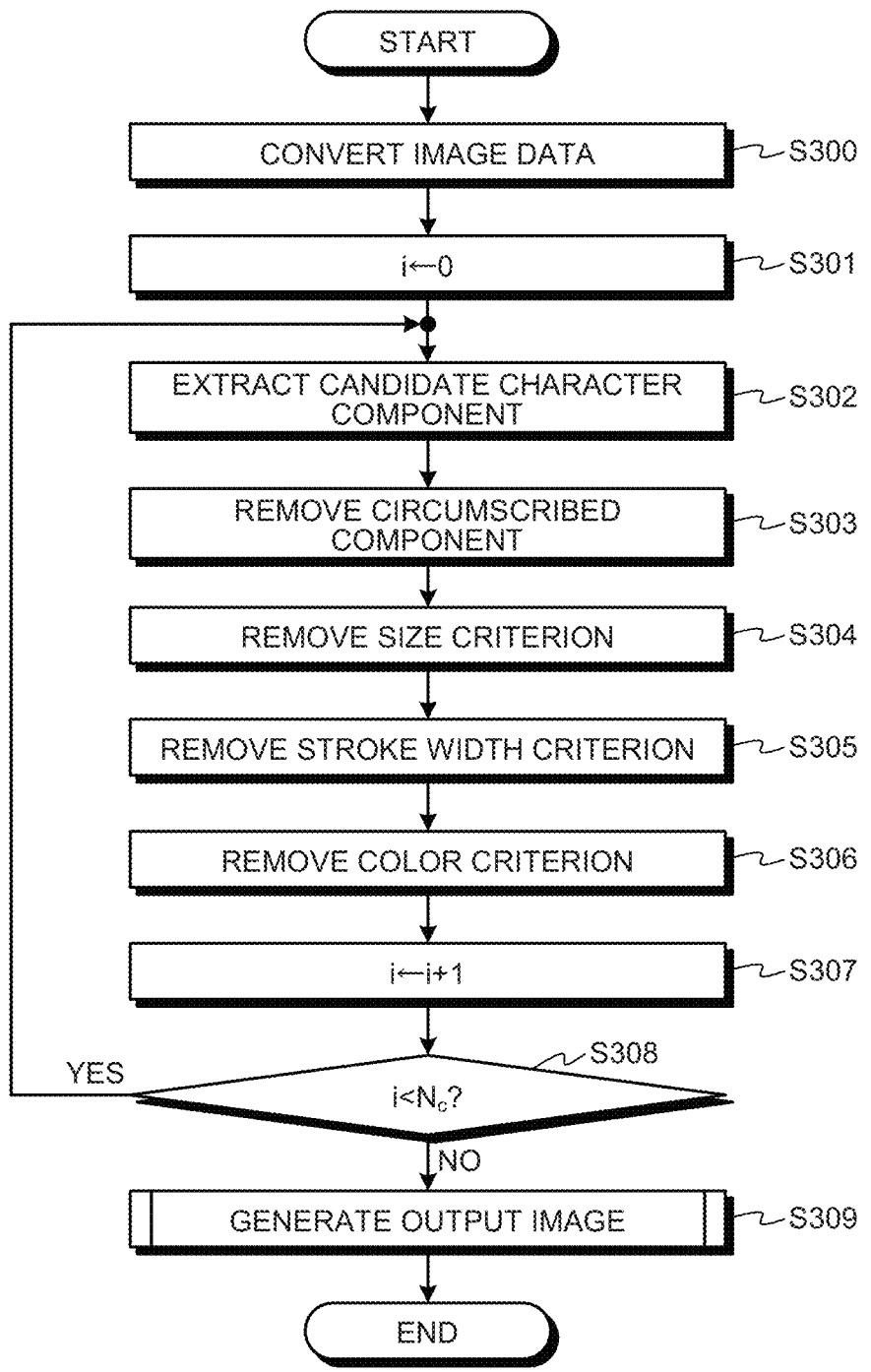
FIG. 7 is a flowchart illustrating the flow of a character pixel extraction process according to an embodiment.

The character pixel extraction process performed in step S103 will now be described with reference to FIG. 7. As illustrated in FIG. 7, the extraction unit 24 first reads the image data as well as the start position and the end position of the sectioned area selected in step S102 from the storage 22, and converts the range corresponding to the sectioned area of the image data to a binary image (step S300). The converted image data is hereinafter referred to as a converted image $I_B$. The image may be converted by a known color clustering method, a known image binarization method, or another image binarization method or multi-valuing method, for example. Note that the image may be converted to a color image or a gray scale image instead of the binary image.

In the present embodiment, for example, the pixel value of the pixel within the range of the sectioned area is converted to 0 when the pixel value is smaller than a predetermined threshold and otherwise converted to 1, so that the converted result is written as the converted image $I_B$.

Next, the extraction unit 24 initializes the variable i to 0, the variable indicating the converted image $I_B$ of which pixel value is currently being processed (step S301). This means that the converted image with the pixel value of 0 is being processed when i=0, while the converted image with the pixel value of 1 is being processed when i=1. The maximum value of i is 1 in the present embodiment where the binary image is employed, but the value of i can be larger than 1 when the color image is employed.

Subsequently, the extraction unit 24 extracts the candidate character component from the converted image $I_B$ to acquire a set of the candidate character component (step S302). The candidate character component is a pixel that is determined as a candidate to be recognized as character information on the basis of a predetermined first criterion. In the present embodiment, the candidate character component is extracted by a known method of extracting a connected component of an image with the first criterion as an example. Here, a set of the connected components including the pixel with the pixel value equal to i is treated as the candidate character component by extracting the connected component while targeting the pixel with the pixel value equal to i (0 or 1 in the present embodiment) in the converted image. The extraction unit 24 also assigns a consecutive identification number starting from 0 to the candidate character component.

While the connected component of the pixels having the same pixel value in the converted image $I_B$ is extracted as the candidate character component in the present embodiment, the connected component to be extracted may be determined by another criterion such as a criterion to extract the connected component of pixels having similar pixel values, odd pixel values, or even pixel values.

Figure 8:
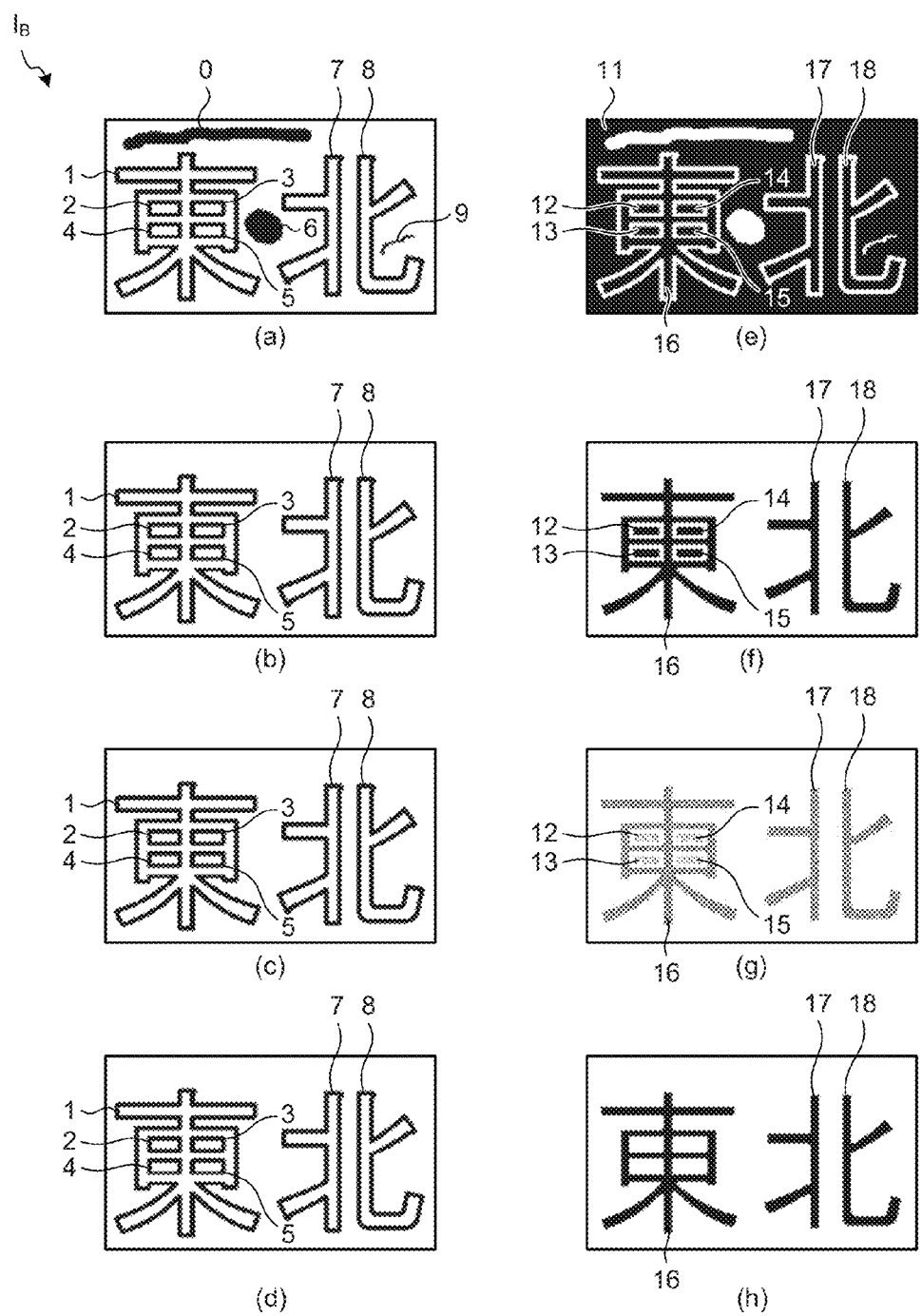
FIG. 8 illustrates the transition of a state of a converted image in the character pixel extraction process according to an embodiment.

FIG. 8 illustrates the transition of state of the converted image $I_B$ when the character pixel extraction process of the present embodiment is performed. After the process in step S302 is performed, the converted image is in the state as illustrated in (a) in FIG. 8 where, when i=0, the candidate character component extracted from the sectioned area is formed of a black pixel while a portion other than the candidate character component is formed of a white pixel. A total of 10 candidate character components numbered from 0 to 9 are extracted from the converted image $I_B$.

From here on, $C_i$ represents a set of candidate character components where the pixel value obtained by the process of extracting the candidate character component in step S302 equals i. The set of candidate character components will be referred to as a candidate character component set.

Subsequently, what is performed in each of step S303 to step S306 is a process of removing a candidate character component that is unlikely to be a part of a character, namely a non-character component, from the candidate character component set $C_i$. A second criterion used in the present embodiment is a criterion to see whether or not the position of the candidate character component in the image data is exceptional compared to that of another candidate character component, whether or not the size of the candidate character component is exceptional compared to that of another candidate character component, whether or not the stroke width of the candidate character component is exceptional compared to that of another candidate character component, and whether or not the number of pixels included in the candidate character component is exceptional compared to that of another candidate character component. The process however is not performed when there is no non-character component to be removed in each step.

The removal unit 25 performs a circumscribed component removal process of removing the non-character component at the exceptional position from the candidate character component set $C_i$ (step S303). In the present embodiment, the candidate character component including a pixel on any of a left edge, a right edge, an upper edge, and a lower edge of the converted image $I_B$ is regarded as the non-character component and removed from the candidate character component set $C_i$, for example. That is, it is assumed that a normal character does not have a part thereof on the upper/lower/left/right edges of the converted image $I_B$, so that the candidate character component including the pixel at a position corresponding to these edges is determined as the non-character component. Here, the candidate character component is not removed since there is no candidate character component including the pixel on the left, right, upper, or lower edge in (a) in FIG. 8, whereby the process proceeds to a next step.

Next, the removal unit 25 performs size criterion removal of removing, from the candidate character component set $C_i$, the candidate character component having the exceptional size and regarded as the non-character component (step S304). In the present embodiment, the candidate character component is removed from the candidate character component set $C_i$ when the length of a long side of a circumscribed rectangle surrounding each candidate character component is equal to a threshold or longer, for example. The threshold may be a predetermined value or determined automatically. A threshold $t_w$ of the length of the long side of the circumscribed rectangle in the present embodiment is calculated by using Equation (5).

$$t_w = sr_w \quad (5)$$

In Equation (5), s represents the length of a short side of the image data, and $r_w$ represents the value of a real number predetermined as a parameter which is set to 0.9 in the present embodiment. In this case, the threshold is calculated to be $t_w=193$ by substituting the length of the short side, s=215 pixels, of the image data illustrated in FIG. 3 into Equation (5).

Figure 9:
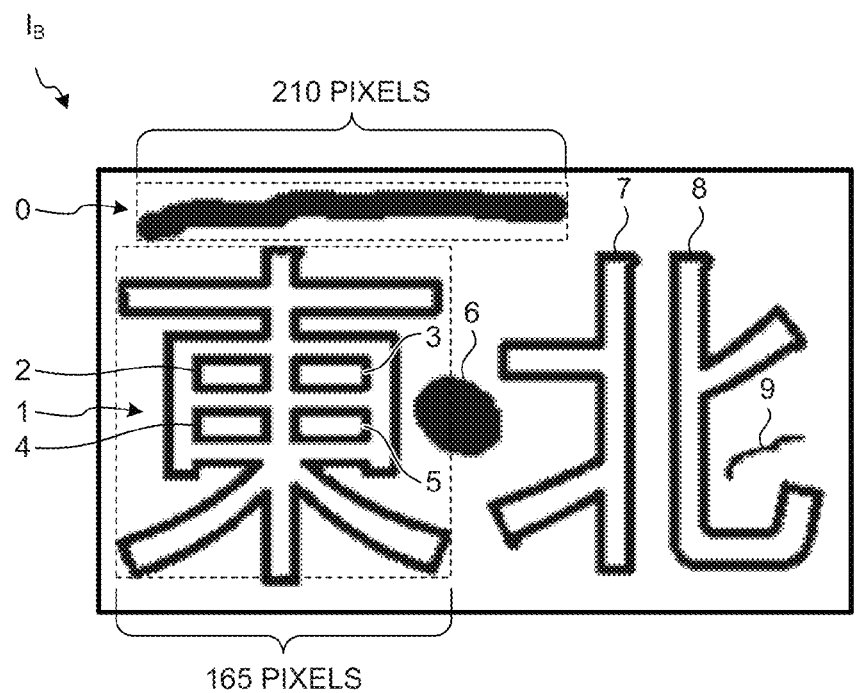
FIG. 9 is a diagram illustrating an example of the state of the converted image according to an embodiment.

A dotted line in FIG. 9 indicates the circumscribed rectangle of each of two candidate character components, the long side of the circumscribed rectangle of which is long, out of the candidate character components being extracted. The length of the long side of the circumscribed rectangle is indicated as well. According to FIG. 9, the length of the long side of the circumscribed rectangle surrounding the candidate character component 0 equals 210 pixels which exceeds the threshold $t_w$, and the length of the long side of the candidate character component 1 equals 165 pixels which does not exceed the threshold $t_w$, whereby the candidate character component 0 is removed in step S304.

Next, the removal unit 25 performs a stroke width removal process of removing the candidate character component having the exceptional stroke width from the candidate character component set $C_i$ (step S305). In the present embodiment, the candidate character component is removed from the candidate character component set $C_i$ when the stroke width of the candidate character component exceeds an upper limit threshold or falls below a lower limit threshold. The stroke width is calculated by using a known method of approximation (reference: The Institute of Electronics, Information and Communication Engineers, Technical Report PRMU 2010-237—PRMU 2010-296, P 112), for example. Specifically, Equation (6) is used to calculate a stroke width $w_{i,j}$ of a j-th candidate character component $C_{i,j}$ (where "j" is an integer of $0 \le j \le 9$) in the set $C_i$.

$$w_{i,j} = \frac{2S_{i,j}}{L_{i,j}} \quad (6)$$

In Equation (6), $S_{i,j}$ represents the number of pixels forming the candidate character component $C_{i,j}$, and $L_{i,j}$ represents a circumference of the candidate character component $C_{i,j}$. The circumference equals the number of black pixels in contact with the white pixels in the converted image $I_B$, for example. Each of the upper limit threshold and the lower limit threshold may be a predetermined value or determined automatically. In the present embodiment, an upper limit threshold $t_u$ and a lower limit threshold $t_b$ are calculated by using Equations (7) and (8), respectively.

$$t_u = \frac{r_u}{|C_i|} \sum_{j=0}^{|C_i|-1} w_{i,j} \quad (7)$$

$$t_b = \frac{r_b}{|C_i|} \sum_{j=0}^{|C_i|-1} w_{i,j} \quad (8)$$

In Equations (7) and (8), parameters "$r_u$" and "$r_b$" are predetermined values that are equal to 2.0 and 0.6, respectively, in the present embodiment.

Figure 10:
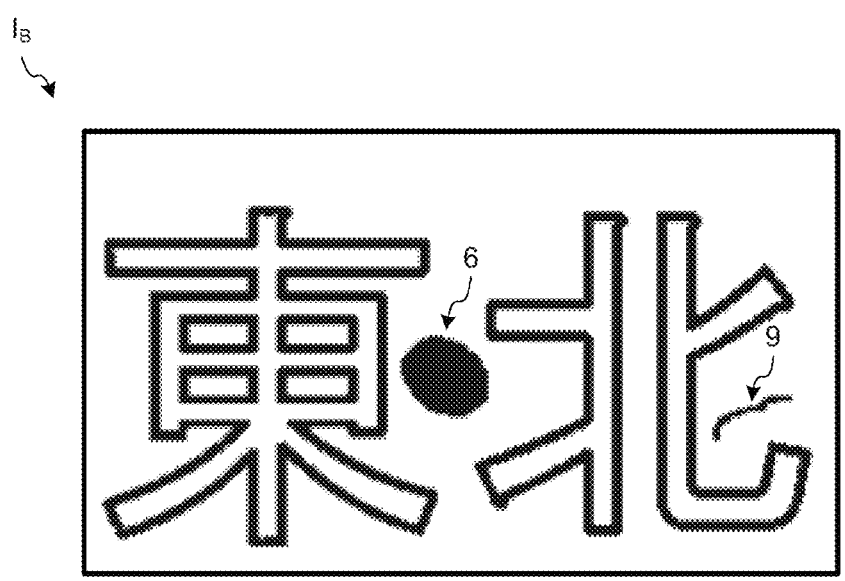
FIG. 10 is a diagram illustrating an example of the state of the converted image according to an embodiment.

FIG. 10 illustrates the candidate character component immediately after the process in step S304 is performed, where the candidate character component 6 has the largest stroke width whereas the candidate character component 9 has the smallest stroke width. The candidate character component 6 is formed of 1380 black pixels, among which 150 black pixels are in contact with the white pixels. The candidate character component 9 is formed of 250 black pixels, among which 160 black pixels are in contact with the white pixels. Therefore, according to Equation (6), the stroke width of the candidate character component 6 equals approximately 18 whereas the stroke width of the candidate character component 9 equals approximately 3. The stroke width of each of other candidate character components calculated in the same manner equals approximately 5. Accordingly, where $r_u$ equals 2.0 and $r_b$ equals 0.6, the value of $t_u$ equals approximately 12.4 and the value of $t_b$ equals approximately 3.7, so that the candidate character component 6 and the candidate character component 9 are deleted in step S305 in the present embodiment. In FIG. 8, (b) illustrates the state of the converted image after the process in step S305 is performed.

Next, the removal unit 25 performs a color criterion removal process of removing, from the candidate character components belonging to the candidate character component set $C_i$, the candidate character component which includes many pixels having exceptional values, compared to a certain value as a criterion, in the image data 500 before the conversion process performed in step S300 (step S306). The pixel value in the image data 500 corresponds to the value of the pixel in the image data 500 present at the same position as the pixel forming the candidate character component. In other words, where the pixel value of arbitrary coordinates (x, y) in the image data is set to I(x, y) and coordinates of the start position of the sectioned area is set to (xs, ys), the pixel value of the pixel in the image $I_B$ at the coordinates (x, y) in the image data can be represented as $I(x+x_s, y+y_s)$. In the present embodiment, it can be determined whether or not the pixel value $I(x+x_s, y+y_s)$ is the exceptional value by using a method of calculating a mean $m_i$ of the pixel values of the pixels forming all the candidate character components belonging to the set $C_i$ in the image data, and determining whether or not an absolute value of a difference between the mean $m_i$ and the pixel value $I(x+x_s, y+y_s)$ is larger than or equal to a predetermined threshold $t_m$. The mean $m_i$ is calculated by using Equation (9).

$$m_i = \frac{\sum x \sum y I(x, y) I_B(x, y)}{\sum x \sum y I_B(x, y)} \quad (9)$$

By calculating the difference between the mean $m_i$ calculated above and the pixel value $I(x+x_s, y+y_s)$, the pixel in the image data determined to have the exceptional pixel value is represented as an exceptional pixel. Moreover, it is determined whether or not the candidate character component $C_{i,j}$ includes many exceptional pixels by, for example, determining whether or not a real number $r_o$ calculated by using Equation (10) exceeds a predetermined threshold $t_o$ in the present embodiment. In the present embodiment, the thresholds $t_m$ and $t_o$ are set to 40 and 0.5, respectively.

$$r_0 = \frac{e_{i,j}}{s_{i,j}} \quad (10)$$

In Equation (10), $e_{i,j}$ represents the number of exceptional pixels forming the candidate character component $C_{i,j}$. In FIG. 8, (c) is a diagram obtained by superposing the image data 500 on (b) in FIG. 8 illustrating the outcome of the process performed in step S305, where there is no exceptional pixel because all the pixels forming the candidate character component in the converted image have the same brightness. As a result, no candidate character component is removed in step S306 when the converted image $I_B$ is what is illustrated in (a) in FIG. 8. Note that a median of the pixel value or a predetermined parameter may be used instead of the mean $m_i$ to determine whether or not the pixel is the exceptional pixel.

Next, the extraction unit 24 adds 1 to the variable i indicating the pixel value currently being processed (step S307) and determines whether or not the variable i is smaller than a maximum value $N_C$ of the pixel value in the converted image (step S308). The converted image being the binary image in the present embodiment, the maximum value equals $N_C$=2.

When the variable i is determined to be smaller than the maximum value $N_C$ of the pixel value in the converted image (step S308: Yes), the process is repeated again from step S302. When the variable i is determined to be not smaller than the maximum value $N_C$ of the pixel value in the converted image (step S308: No), on the other hand, the extraction unit 24 extracts a character pixel from the candidate character component not removed and writes the character pixel to the storage 22 as an output image (step S309).

Where i=1, the candidate character component as illustrated in (e) in FIG. 8 is extracted in the process of extracting the candidate character component in step S302. In FIG. 8, (e) illustrates the candidate character component with the black pixel and a part other than the candidate character component with the white pixel when i=1.

The removal unit 25 removes the candidate character component including the pixel on the left, right, upper, and lower edges of the converted image $I_B$, in the process of removing the circumscribed component in step S303. No candidate character component is deleted in step S304 because the length of the long side of the circumscribed rectangle does not exceed the threshold in any of the candidate character components. No candidate character component is deleted in step S305 either because there is no candidate character component that has the stroke width exceeding the upper limit threshold or falling below the lower limit threshold. In FIG. 8, (f) illustrates the state of the candidate character component after the process up to step S305 is performed when i=1.

Subsequently, the candidate character component including many exceptional pixels is deleted in step S306. In FIG. 8, (g) is a diagram obtained by superposing the image data on the converted image illustrated in (f) in FIG. 8, in which case the pixel value of all the pixels forming candidate character components 16, 17, and 18 equals 54, the pixel value of all the pixels forming candidate character components 12, 13, 14, and 15 equals 194, and the mean $m_i$ equals 68. That is, an absolute value of a difference between the pixel value of all the pixels forming the candidate character components 12, 13, 14, and 15 and the mean $m_i$ equals $t_m$=40 or larger, whereby the real number calculated by Equation (10) for each of the candidate character components 12, 13, 14, and 15 equals $r_o$=1.0 which exceeds the threshold $t_o$=0.5. Therefore, the removal unit 25 removes each of the candidate character components 12, 13, 14, and 15 including many exceptional pixels in step S306. No other candidate character component is deleted. In FIG. 8, (h) illustrates the candidate character component remaining after the process performed in step S306. At this stage, one can obtain the candidate character component set $C_i$, from which the non-character component is removed, in each case where i=0 and i=1.

Figure 11:
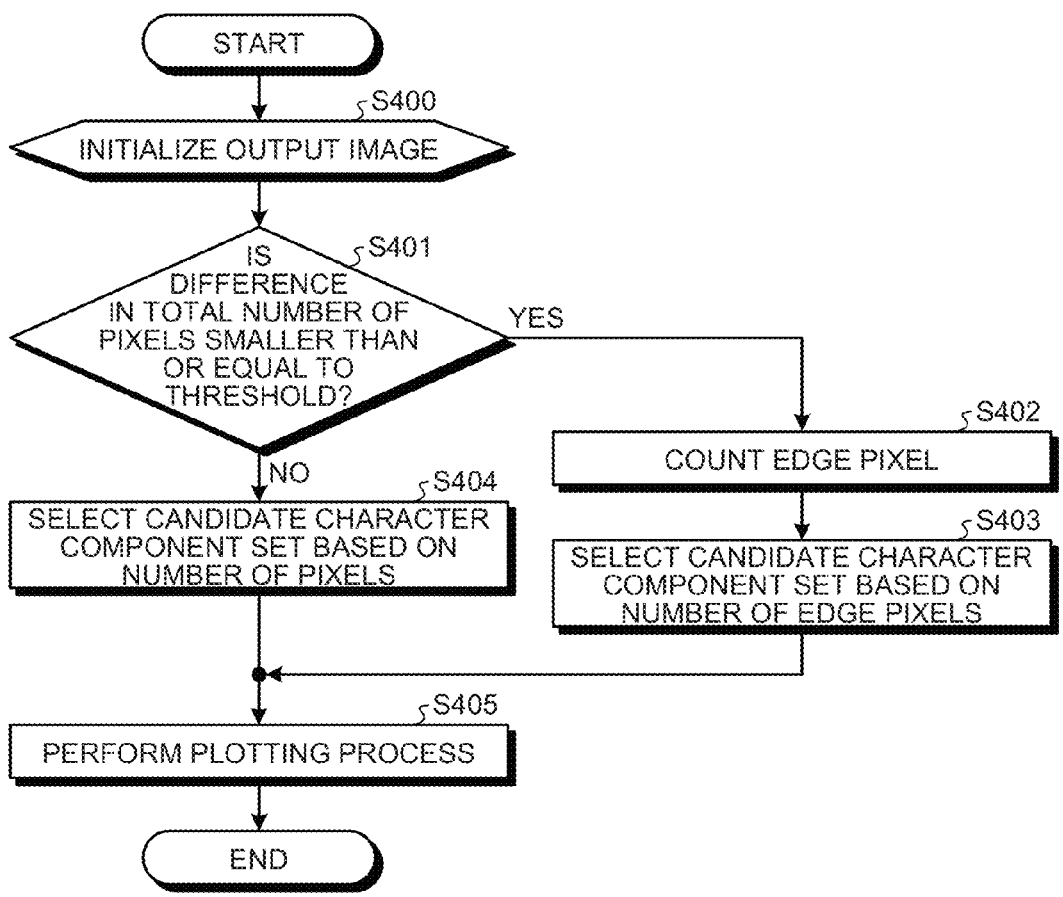
FIG. 11 is a flowchart illustrating the flow of a process of generating an output image according to an embodiment.

Now, the process of generating the output image performed in step S309 of FIG. 7 will be described with reference to FIG. 11. The extraction unit 24 initializes the pixel value within the sectioned area of the output image (step S400). The sectioned area is the area selected by the sectioning unit 23 in step S102. The output image is the image having the same width and height as that of the image data so that the start position and the end position of the sectioned area in the output image are the same as that in the image data. Moreover, 0 is substituted for the pixel value when initializing the output image.

Subsequently, the pixel counting unit 26 calculates the total number of pixels forming the candidate character component that belongs to each of candidate character component sets $C_0, C_1, \ldots, C_{NC-1}$ in the gradation of all the pixel values. The extraction unit 24 then determines whether or not there is an enough difference between the total number of pixels of the converted image $I_B$ in the gradation of the pixel value with the largest number of pixels and the total number of pixels of the converted image $I_B$ in the gradation of the pixel value with the second largest number of pixels (step S401). The total number of pixels is specifically calculated by using Equation (11).

$$S_i = \Sigma_{j=0}^{|C_i|} S_{i,j} \tag{11}$$

In Equation (11), $S_{i,j}$ represents the number of pixels forming the candidate character component $C_{i,j}$, and $S_i$ represents the total number of pixels of the candidate character component set $C_i$ when the pixel value equals i. Among the candidate character component sets $C_i$ for each pixel value, the difference between the largest number of pixels and the second largest number of pixels may be an absolute value of the difference between the largest total number and the second largest total number, a ratio between the largest total number and the second largest total number, or another value indicating the difference in numbers between the largest total number and another total number.

In the present embodiment, it is determined whether there is the enough difference by determining whether or not the calculated difference exceeds a threshold. The threshold may be a predetermined value or determined automatically. A threshold $t_s$ is calculated by using Equation (12) in the present embodiment, for example.

$$t_s = r_s \max_{0 \leq i \leq N_c}(S_i) \tag{12}$$

In Equation (12), $r_s$ represents a predetermined parameter which is set to 0.2 in the present embodiment. Function max( ) outputs the maximum argument value. That is, the max function in Equation (12) outputs the maximum value among the total number of $N_c$ pixel values. In the present embodiment where $N_c$=2, (d) in FIG. 8 illustrates a candidate character component set $C_0$ and (h) in FIG. 8 illustrates a candidate character component set $C_1$.

The number of black pixels in the candidate character component set $C_0$ illustrated in (d) in FIG. 8 equals 14500 pixels, and the number of black pixels in the candidate character component $C_1$ illustrated in (h) in FIG. 8 equals 12700 pixels, thereby giving $S_0$=14500 and $S_1$=12700. In this case, the threshold equals $t_s$=2900 whereas the difference equals $|S_0-S_1|$=1800, whereby the difference between $S_0$ and $S_1$ is smaller than or equal to the threshold.

When it is determined that the difference in the total number of pixels is smaller than or equal to the threshold (step S401: Yes), the edge counting unit 27 counts the edge pixel among the pixels forming the candidate character component that belongs to each candidate character component set $C_i$ and calculates the total number of edge pixels (step S402). The edge pixel is the pixel expressing an edge or outline of the pixels forming the candidate character component. In the present embodiment, the pixel not belonging to the candidate character component set $C_i$ but adjacent to the candidate character component $C_{i,j}$ is determined to be the edge pixel of the candidate character component $C_{i,j}$.

Figures 12, 13:
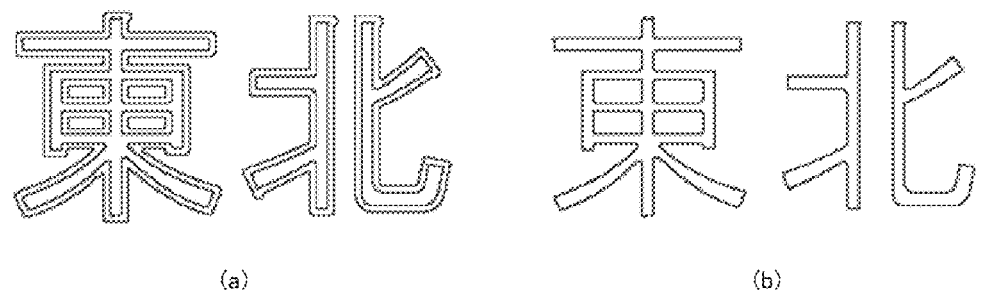
FIG. 12 illustrates edge pixels in the converted image according to an embodiment.
FIG. 13 is a diagram illustrating the output image being output according to an embodiment.

In FIG. 12, (a) illustrates the edge pixel of the candidate character component $C_{i,j}$ that belongs to the candidate character component set $C_0$. In FIG. 12, (b) illustrates the edge pixel of the candidate character component $C_{i,j}$ that belongs to the candidate character component set $C_1$. Where a variable $E_i$ represents the number of pixels of each edge pixel, the variable equals $E_0$=5600 and $E_1$=2800.

Next, the extraction unit 24 selects the candidate character component set to be written as the output image on the basis of the value of the number of edge pixels (step S403). Specifically, the extraction unit 24 selects the candidate character component set $C_i$ with the smallest total number of edge pixels. The candidate character component set $C_1$ is selected in the present embodiment.

When it is determined that the difference in the total number of pixels is not smaller than or equal to the threshold (step S401: No), on the other hand, the extraction unit 24 selects the candidate character component set to be written as the output image on the basis of the value of the number of pixels (step S404). Specifically, the extraction unit 24 selects the candidate character component set $C_i$ with the largest total number of pixels forming the candidate character component that belongs to the candidate character component set $C_i$.

The extraction unit 24 now performs a plotting process of writing the pixel forming the selected candidate character component set $C_i$ out on the output image in the storage 22 as an extracted character pixel (step S405). In the present embodiment where the start position of the sectioned area have coordinates $(x_s, y_s)$ and all the pixels forming the candidate character component $C_{i,j}$ in the converted image $I_B$ have coordinates (x, y), 1 is substituted for the pixel value having coordinates $(x+x_s, y+y_s)$ in the output image. In the present embodiment, the image illustrated in (h) in FIG. 8 is plotted as the output image written in step S405.

The same character pixel extraction process is performed on the sectioned area 520 in FIG. 6 so that the output image of the whole image data as illustrated in FIG. 13 is written to the storage 22.

Figure 14:
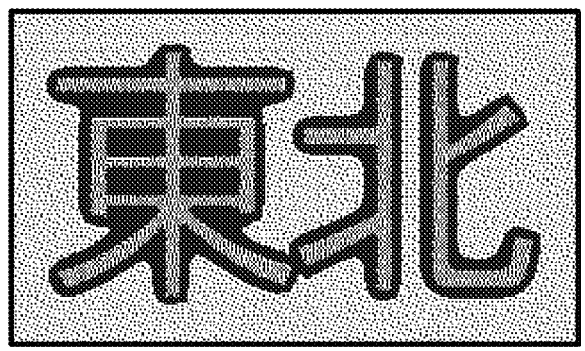
FIG. 14 is a diagram illustrating an example of the image data according to an embodiment.

Now, an outcome of the process performed on another image data will be described with reference to FIG. 14. FIG. 14 illustrates a case where outlines of difference characters are in contact with each other. In this case, the whole image is sectioned as one sectioned area by the sectioning unit 23. Accordingly, the extraction unit 24 obtains a candidate character component set $C_0$ illustrated in (d) in FIG. 15 from the state illustrated in (a) in FIG. 15 when i=0, and obtains a candidate character component set $C_1$ illustrated in (h) in FIG. 15 from the state illustrated in (e) in FIG. 15 when i=1. In this case, the image illustrated in (h) in FIG. 15 is written to the storage 22 as the output image in the end.

Figure 16:
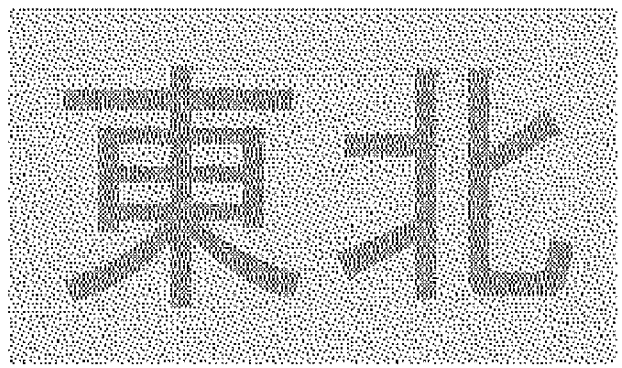
FIG. 16 is a diagram illustrating an example of the image data according to an embodiment.

Moreover, a case illustrated in FIG. 16 will be described as another example. In this case, the whole image is sectioned as one sectioned area by the sectioning unit 23. Accordingly, the extraction unit 24 obtains a candidate character component set $C_0$ illustrated in (d) in FIG. 17 from the state illustrated in (a) in FIG. 17 when i=0, and obtains a candidate character component set $C_1$ illustrated in (h) in FIG. 17 from the state illustrated in (e) in FIG. 17 when i=1. In this case, the image illustrated in (d) in FIG. 17 is written to the storage 22 as the output image in the end.

Furthermore, (a) and (b) in FIG. 18 illustrate image data when the image data of a handwritten character is input. In the present embodiment, an output image of a normal character illustrated in (b) in FIG. 18 can be obtained from the outlined image data illustrated in (a) in FIG. 18.

When there is a significant difference between the number of character pixels in the converted image in the gradation with the largest number of pixels and the number of character pixels in the converted image in the gradation with the second largest number of pixels, the aforementioned image processing apparatus 10 of the present embodiment selects, as the output image, the candidate character component from which the non-character component is removed in the gradation having the largest number of pixels. When there is no significant difference between the number of character pixels in the converted image in the gradation with the largest number of pixels and the number of character pixels in the converted image in the gradation with the second largest number of pixels, the image processing apparatus selects, as the output image, the candidate character component of the converted image from which the non-character component is removed in the gradation having the smallest number of edge pixels.

Accordingly, in selecting the output image, one can obtain the output image of a normal character from which the outline is properly removed even when the outlines overlap. The process does not require the use of a character recognition dictionary to perform calculation, whereby the processing load can be reduced as well.

Furthermore, the image is sectioned into each area having the different pixel disposition and then subjected to the conversion process, thereby enabling the extraction of the candidate character component and the removal of the non-character component to be performed efficiently.

While certain embodiments have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from the spirit of the inventions. The accompanying claims and their equivalents are intended to cover such forms or modifications as would fall within the scope and spirits of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a processor that
acquires image data,
extracts a set of candidate character components from the image data for each gradation of the image data on the basis of a predetermined first criterion,
removes a non-character component from the set of the candidate character components on the basis of a predetermined second criterion;
counts the number of character pixels representing the number of pixels included in the candidate character component after the non-character component is removed;
counts the number of edge pixels representing the number of edge pixels adjacent to the candidate character component after the non-character component is removed;
selects as an output image the candidate character component, from which the non-character component is removed, in the gradation having a largest number of pixels when there is a significant difference between the number of character pixels in the gradation having the largest number of character pixels and the number of character pixels in the gradation having the second largest number of character pixels,
selects as the output image the candidate character component, from which the non-character component is removed, in the gradation having a smallest number of edge pixels when there is no significant difference between the number of character pixels in the gradation having the largest number of character pixels and the number of character pixels in the gradation having the second largest number of character pixels, and
outputs the output image being selected.

2. The apparatus according to claim 1, wherein the processor removes from the set the candidate character component that is exceptional as the non-character component at least one of when a position of the candidate character component in the image data is exceptional compared with that of another one of the candidate character component, when a size of the candidate character component is exceptional compared with that of another one of the candidate character component, when a stroke width of the candidate character component is exceptional compared with that of another one of the candidate character component, and when the number of pixels included in the candidate character component is exceptional compared with that of another one of the candidate character component.

3. The apparatus according to claim 1, wherein the processor converts the image data being acquired to a binary image.

4. The apparatus according to claim 1, wherein the processor divides the image data being acquired into one or more sectioned areas grouped by a disposition of a pixel value,
extracts the candidate character component for each of the sectioned areas, and
removes the candidate character component for each of the sectioned areas.

5. The apparatus according to claim 4, wherein the processor divides the image data into one or more small areas smaller than the sectioned area, generates a histogram of the pixel value for each of the small areas, and determine a set of the small areas each having a similar value in a histogram as the sectioned area.

6. An image processing method comprising:

acquiring image data;

extracting a set of candidate character components from the image data for each gradation of the image data on the basis of a predetermined first criterion;

removing a non-character component from the set of the candidate character components on the basis of a predetermined second criterion;

counting a number of character pixels representing the number of pixels included in the set after the non-character component is removed;

counting a number of edge pixels representing the number of pixels that is a pixel adjacent to the set after the non-character component is removed;

selecting as an output image the candidate character component, from which the non-character component is removed, in the gradation having a largest number of pixels when there is a significant difference between the number of character pixels in the gradation having the largest number of character pixels and the number of character pixels in the gradation having the second largest number of character pixels;

selecting as the output image the candidate character component, from which the non-character component is removed, in the gradation having a smallest number of edge pixels when there is no significant difference between the number of character pixels in the gradation having the largest number of character pixels and the number of character pixels in the gradation having the second largest number of character pixels; and outputting the output image.

* * * * *